United States Patent [19]
Merle et al.

[11] Patent Number: 5,754,359
[45] Date of Patent: May 19, 1998

[54] AUDIOVISUAL FILMSTRIP IMAGE DISPLAY APPARATUS AND METHOD USING FILM CARRIED MAGNETIC SIGNALS

[75] Inventors: Thomas Clark Merle, Rochester; Dennis Francis Tianello, Spencerport, both of N.Y.

[73] Assignee: Eastman Kodak Company, Rochester, N.Y.

[21] Appl. No.: 854,117

[22] Filed: May 9, 1997

Related U.S. Application Data

[63] Continuation of Ser. No. 471,035, Jun. 6, 1995, abandoned.

[51] Int. Cl.$^6$ .................................................. G03B 31/00
[52] U.S. Cl. .................................. 360/80; 353/15; 352/20; 352/92; 434/307 R
[58] Field of Search .................. 360/80, 3; 353/15–19; 352/17, 20, 92; 434/307 R; 396/319

[56] References Cited

U.S. PATENT DOCUMENTS

| | | | |
|---|---|---|---|
| 3,543,424 | 12/1970 | Klein | 359/806 X |
| 3,575,552 | 4/1971 | Grant et al. | 360/13 X |
| 3,772,473 | 11/1973 | Parham | 360/80 |
| 3,785,073 | 1/1974 | Van Tine | 359/801 X |
| 3,843,241 | 10/1974 | Swerdlow et al. | 360/3 X |
| 3,979,774 | 9/1976 | Chen et al. | 360/80 |
| 4,115,824 | 9/1978 | Mindell | 360/80 |
| 4,234,244 | 11/1980 | Klein | 350/241 |
| 4,379,312 | 4/1983 | Lee | 360/80 |
| 4,491,434 | 1/1985 | Barr et al. | 40/362 X |
| 5,030,978 | 7/1991 | Stoneham et al. | 354/21 |
| 5,231,438 | 7/1993 | Smart | 354/281 |
| 5,287,136 | 2/1994 | Kitagawa et al. | 354/173.1 |

*Primary Examiner*—Andrew L. Sniezek
*Attorney, Agent, or Firm*—Frank Pincelli

[57] ABSTRACT

An audiovisual filmstrip image display apparatus and method includes an image displayer, such as a viewer projector, television or computer screen or the like, together with an audio speaker and a converter including a player, capable of playing multiple sound programs or sequences stored on sound storage equipment either internal or separate and a signal detector for reading magnetic signals on a filmstrip to indicate to the player the sound program to be played in conjunction with each individual filmstrip image being viewed. Various forms of equipment which may be included in an apparatus according to the invention are disclosed.

9 Claims, 2 Drawing Sheets

1

AUDIOVISUAL FILMSTRIP IMAGE DISPLAY APPARATUS AND METHOD USING FILM CARRIED MAGNETIC SIGNALS

This is a Continuation of application Ser. No. 08/471,035, filed Jun. 6, 1995 now abandoned.

FIELD OF THE INVENTION

This invention relates to audiovisual display apparatus and methods and, in particular, to apparatus and methods for displaying filmstrip images together with sound, including recorded commentary, background sounds or music related to the images being displayed.

BACKGROUND OF THE INVENTION

The use of projectors and individual viewers for viewing filmstrip images for instructional and entertainment purposes is known in the art. It is also known to provide pre-recorded sound accompaniment for use with filmstrips and to include a sound signal on the recording that indicates to the operator a time for changing to the next image on the filmstrip. It is also known, in the case of moving picture film, to provide a magnetic sound track on the film from which sound accompaniment to the moving pictures may be read and played by projection apparatus.

It is now possible to provide filmstrips having multiple images for selective or sequential viewing together with a magnetic sound track on the filmstrip for use in various types of viewing and projection equipment. In a recent development, the filmstrips may be stored in thrust film cartridges that protect the filmstrip during handling and allow it to be automatically or manually advanced for frame by frame viewing in equipment provided for that purpose. However, the magnetic sound track associated with each image of the filmstrip is, in general, not sufficient in size or length to carry a sound program with the amount of commentary or other sound accompaniment desired to utilize the filmstrip's magnetic track for direct playing of programs or sound sequences to accompany the individual frame images on the filmstrip.

SUMMARY OF THE INVENTION

The present invention provides audiovisual filmstrip image display apparatus and methods for use with filmstrips having a readable magnetic track and adapted for stationary viewing of images from individual frames of the filmstrip. The apparatus in general may include an image displayer, such as a viewer, projector or electronic screen, such as a television or personal computer. It also requires an audio speaker of any suitable type, which may be included in or separate from the viewing or projection apparatus, and a convertor including a magnetic reader to read magnetic signals applied on the magnetic track of the filmstrip and a player to play an audible sound program associated with the signals. Since the filmstrip signals are generally inadequate to contain a sound program of the size desired, the player includes or can receive recorded means having a plurality of sound programs or sequences individually connectable with the audio speaker for selectively playing the programs and a signal detector for reading the magnetic signals from the track and electronically directing the player to play a selected sound program related to each individual filmstrip image.

The player may include a receiver for multiple program storage means, such as tapes, compact discs or sound containing cards, and it may include a programmable sound storage device such as a hard disc of a personal computer or the like. The signal detector may include a magnetic read unit for reading the magnetic film signals or flags and sending them to the appropriate portions of the convertor for actuating the player to play the associated sound segments or programs. The viewer, projector or other film handling device is preferably adapted for use with thrust type film cartridges so that protected and enclosed filmstrips may be utilized in the audiovisual apparatus and rewound into the cartridge after use for protection and storage.

These and other features and advantages of the invention will be more fully understood from the following detailed description of the invention taken together with the accompanying drawings.

DETAILED DESCRIPTION OF THE INVENTION

Figure 1:
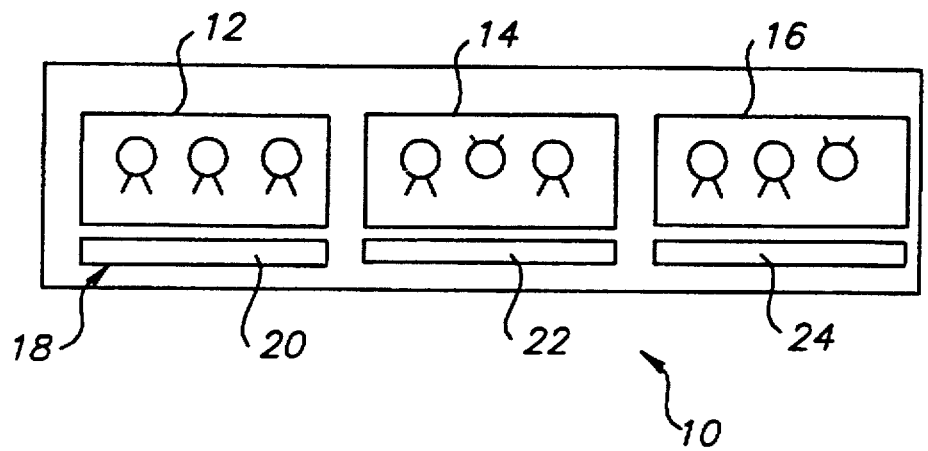
FIG. 1 is a plan view of a portion of a filmstrip illustrating several individual frames containing images with accompanying sound signals or flags contained on an associated magnetic recording track.

Referring to FIG. 1 of the drawings in detail, there is shown a portion of a filmstrip generally indicated by numeral 10. The filmstrip 10 includes a number of individual frames having diverse images 12, 14, 16 longitudinally spaced along the filmstrip A magnetic track 18 is provided along one side of the filmstrip on which are recorded magnetic sound signals or flags 20, 22, 24, respectively associated with each of the film images 12, 14, 16. The film images are adaptable for direct viewing or projection by an operator or for conversion by a scanner into digital electronic images capable of being viewed on electronic equipment such as a television set or personal computer. The sound signals or flags are of sufficient length to indicate through a magnetic reader an appropriate sound program to be played by an external or internal player device during viewing of the associated image.

Figure 2:
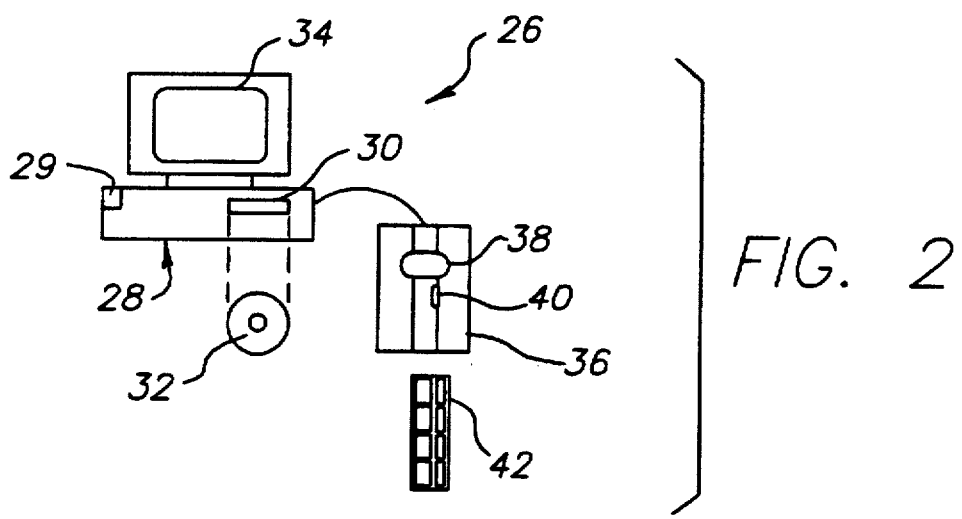
FIG. 2 is a schematic representation of apparatus including a personal computer with CD-ROM player and an accompanying scanner and read unit for reading and displaying filmstrips with accompanying sound sequences.

FIG. 2 illustrates one form of audiovisual filmstrip image display apparatus 26 which is capable of use in accordance with the invention. Apparatus 26 includes a personal computer 28 including an audio speaker 29 and a CD-ROM reader 30 capable of reading a CD-ROM disk 32 containing sound programs for use in association with individual filmstrips. Computer 28 also includes the usual electronic screen 34 and is connected with a film handling unit 36 which includes means not shown for moving a filmstrip through the unit, as well as a scanner 38 and a magnetic reader 40.

As a filmstrip 42 is fed through the film handling unit 36, the scanner 38 digitizes the image on each individual frame of the filmstrip and feeds the signals into the personal computer for storage or direct projection on the screen 34. Concurrently, the magnetic reader reads the magnetic signals on the film track and indicates to the CD-ROM reader in the computer, the particular program of sound to be played in conjunction with the specific image being displayed on the screen. Alternatively, the information may be electronically stored together with image information for playing by the computer at a later time. Sound sequences could, of course, be stored on any suitable sound equipment that is internal of or playable by the personal computer. Such sound sequences could include, for example, verbal descriptions of a scene or historical facts about a particular image being viewed. They could also include background sounds, such as cheerleaders at a football game, car horns beeping, surf at a beach, music performances and so forth.

Figure 3:
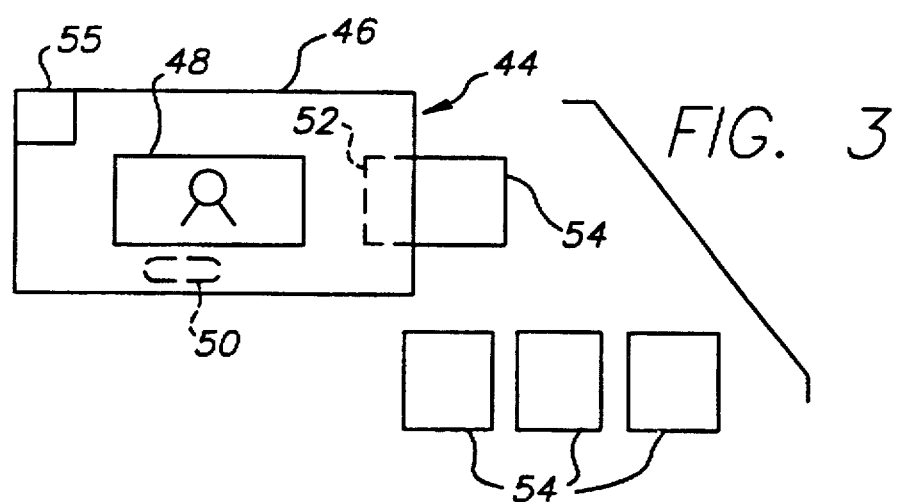
FIG. 3 is a schematic view illustrating an individual filmstrip image viewer including a magnetic reader and a player capable of receiving individual sound cards containing multiple sound programs for playing sound sequences associated with individual filmstrips available for use with the viewer.

FIG. 3 illustrates an alternative embodiment of audiovisual filmstrip image display apparatus 44. This apparatus includes an image viewer 46 having internal means, not shown, for handling a filmstrip and advancing it frame by frame into viewing position, either automatically or under the control of the operator. Viewer 46 includes a viewing station 48 as well as a magnetic reader 50 for reading sound signals on the magnetic track on the associated filmstrip. A sound card reader 52 is also provided for receiving any of a plurality of individual sound cards 54, each capable of being separately installed in the card reader. Each of the sound cards carries preprogrammed sound programs or sequences which are playable through the viewer in connection with an internal speaker 55 or an external sound system, not shown. Selection of the programs to be played is determined by the sound signals or flags on the filmstrip which are read by the magnetic reader 50. The availability of interchangeable sound cards for use with the viewer allows the signals on the magnetic reader to be repeatedly utilized with the same or different filmstrips to play differing sound programs associated with the various filmstrips.

Figure 4:
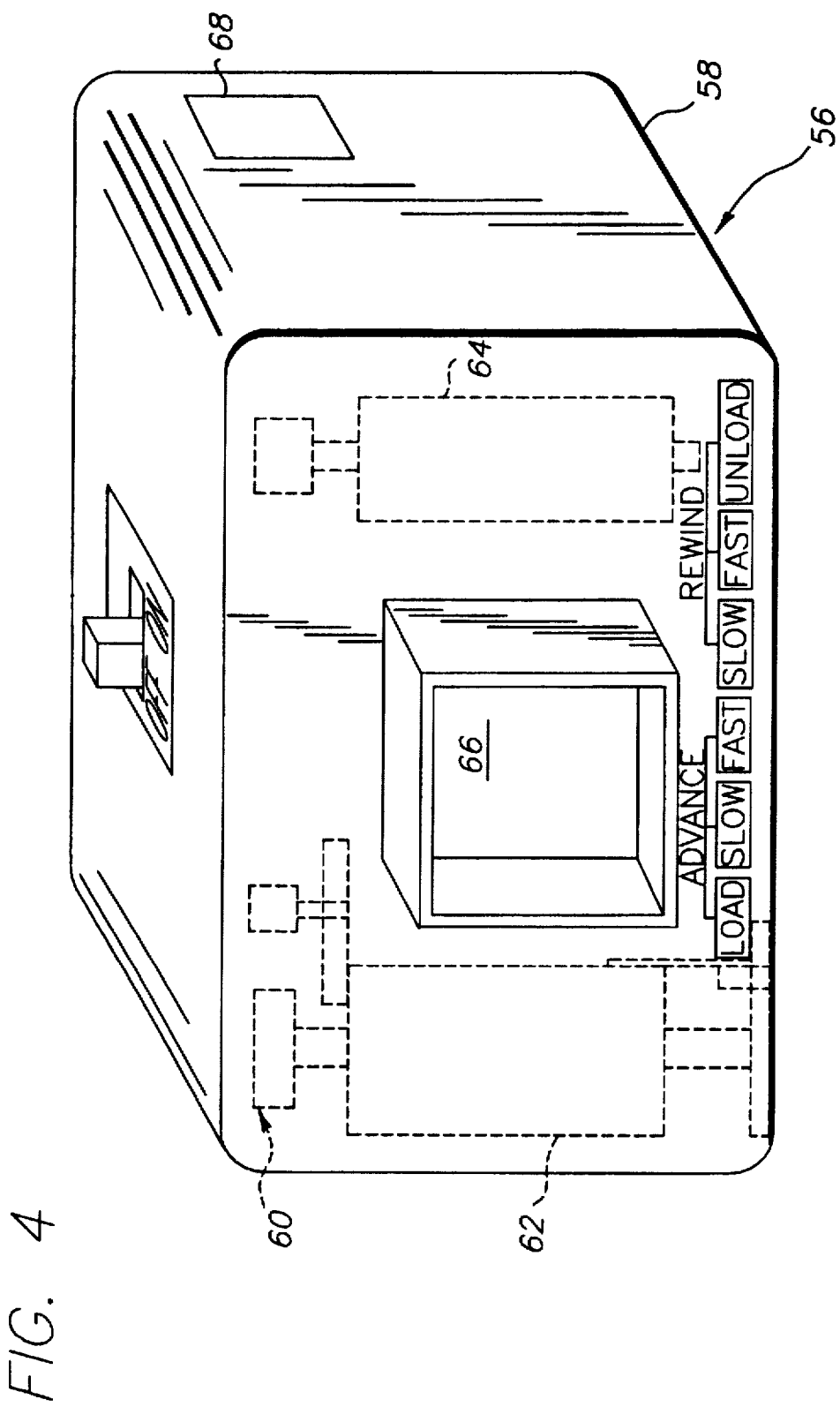
FIG. 4 is a pictorial view of a filmstrip film projector apparatus which includes film cartridge receiving, advancing and rewind mechanisms and may include magnetic reading and sound reproducing equipment integral or associated with the projector for playing sound programs associated with the filmstrips.

FIG. 4 illustrates still another audiovisual filmstrip image display apparatus generally indicated by numeral 56. Apparatus 56 takes the form of a small film projector 58 having a film handling system 60 capable of receiving a thrust film cartridge 62 and advancing a filmstrip from the cartridge through an internal projection station, not shown, to a take-up spool 64. The system 60 can then provide sequential or selective advancing of the filmstrip to the final frame and subsequent rewinding of the film into the cartridge for storage. A projection lens 66 is mounted on the projector 58 in alignment with the film projection station. A suitable illumination light and reflector, not shown, are mounted on the back of the projector 58, also in alignment with the film projection station. A magnetic reader, not shown, but which may be similar to reader 50 in viewer 46 of FIG. 3, is included in the projector 56. A sound system is also provided including a speaker 68 and a player for playing the sound programs or sequences associated with the film images as described in connection with the previously described embodiments. An external speaker and sound system could be used, if desired, in place of the internal system.

The embodiments described above represent merely examples of various types of filmstrip image display apparatus that may be used in accordance with the invention for viewing filmstrip images with associated magnetic sound signals that are programmed to initiate the sound sequences or programs prerecorded on associated sound recording equipment. Such use permits the limited magnetic storage capability of the filmstrip magnetic tracks to key the separate sound equipment for playing extensive sound programs associated with each individual filmstrip which could not be recorded on the limited space available on the magnetic track for each individual film frame. Such filmstrips and associated sound recordings are seen as being particularly useful for educational programs in schools or for individual use, as well as for entertainment programs. Even consumer developed programs could be recorded for viewing personal photographs accompanied by sound programs or descriptions recorded by the viewer on suitable recording equipment which is capable of being operated by signals from magnetic tracks on the associated filmstrips. Many additional uses for the apparatus of the present invention may be conceived of by those skilled in the art.

Although the invention has been described by reference to certain specific embodiments, it should be understood that numerous changes may be made within the spirit and scope of the inventive concepts described. Accordingly, it is intended that the invention not be limited to the described embodiments, but that it have the full scope defined by the language of the following claims.

| Parts List | |
|---|---|
| 10. filmstrip | 38. scanner |
| 12. image | 40. magnetic reader |
| 14. image | 42. filmstrip |
| 16. image | 44. apparatus |
| 18. magnetic track | 46. viewer |
| 20. sound signals (flags) | 48. viewing station |
| | 50. magnetic reader |
| 22. sound signals (flags) | 52. sound card reader |
| | 54. sound cards |
| 24. sound signals (flags) | 55. speaker |
| | 56. apparatus |
| 26. apparatus | 58. projector |
| 28. personal computer | 60. film handling system |
| 29. audio speaker | 62. thrust film cartridge |
| 30. CD-ROM reader | |
| 32. CD-ROM disk | 64. take-up spool |
| 34. electronic screen | 66. projection lens |
| 36. film handling unit | 68. speaker |

What is claimed is:

1. Audiovisual filmstrip image display apparatus for filmstrips having a readable magnetic track and adapted for stationary viewing of images from individual frames of the filmstrip, said apparatus including an image displayer and an audio speaker and characterized by:

a converter operable for reading magnetic signals keyed to said individual frame images and applied on said magnetic track of the filmstrip and playing an audible sound program associated with said signals; said converter including;

a player having a plurality of sound programs individually connectable with said audio speaker for selectively playing any of said plurality of programs in any desired order; and a signal detector for reading said magnetic signals from the track and conducting the output to the player for selecting the particular programs to be played as indicated by the signals in connection with the respective film images.

2. The invention as in claim 1 characterized in that:

said image displayer is a personal computer having an electronic screen output, the apparatus further including a scanner connected with said computer to digitize image information from each frame and feed it to the computer;

said signal detector is a magnetic read unit associated with said scanner and connected with said computer to transmit the output from reading the magnetic signals to the computer; and said player is connected with the computer and includes electronically stored sound programs playable on command of the computer in response to the signal detector output.

3. The invention as in claim 1 characterized in that said image displayer is a personal viewer and said signal detector is mounted in said viewer.

4. The invention as in claim 3 characterized in that said player includes a receiver for program storage means having multiple sound programs selectable by the player in response to the output of the signal detector.

5. The invention as in claim 3 characterized in that said viewer includes thrust film cartridge receiving and handling means for selectively moving frames from filmstrips contained in a thrust cartridge into viewing position.

6. The invention as in claim 1 characterized in that said image displayer is an image projector and said signal detector is mounted on said projector.

7. The invention as in claim 6 characterized in that said projector includes a receiver for program storage means having multiple sound programs selectable by the player in response to the output of the signal detector.

8. The invention as in claim 6 characterized in that said projector includes thrust film cartridge receiving and handling means for selectively moving frames from filmstrips contained in a thrust cartridge into position for projection.

9. A method for presenting audiovisual programs including sequential visual images accompanied by related sound sequences, characterized by:

providing a photographic filmstrip having a plurality of images thereon and a magnetic track on the filmstrip adjacent to said images;

recording on the magnetic track signals individually keyed to each of said images;

providing a player for reproducing sound sequences stored on associated storage means;

recording on said storage means a plurality of individual sound sequences to be played in association with the viewing of respective individual images on the filmstrip;

providing image display apparatus for individually displaying the images on the filmstrip;

providing a magnetic reader for reading signals on the magnetic track of a filmstrip relating to a specific image being displayed by the display apparatus;

displaying individual images from the filmstrip with the image display apparatus and concurrently reading the magnetic signals associated with the respective images on the filmstrip; and operating the player in response to the signals read by the magnetic reader to play any of the specific sound sequences and in any order, the played sequence determined by the signals on said magnetic track associated with the respective images during displaying of said images.

* * * * *